Patented Nov. 12, 1935

2,020,673

UNITED STATES PATENT OFFICE 2,020,673

PRODUCTION OF OXYGEN-CONTAINING ADDITION PRODUCTS OF ETHYLENE

Henry Dreyfus, London, England

No Drawing. Application December 15, 1932, Serial No. 647,434. In Great Britain December 22, 1931

6 Claims. (Cl. 260—106)

This invention relates to the manufacture of addition products from olefines, and especially to the manufacture of ethanol, diethyl ether, and/or ethyl acetate from ethylene.

I have found that such addition products may be formed from olefines in a very satisfactory manner in the presence of organic acids. Thus, for instance ethanol and/or diethyl ether may be produced from ethylene and water or water vapor in the presence of organic acids, for instance aliphatic acids, while, especially if a comparatively small amount of water or even no water at all is used, the ethyl ester of the acid employed may be formed, together with or in place of the ethanol and/or diethyl ether.

The reaction is preferably performed at high or relatively high temperatures, for instance 150° to 600° C. or more, and especially at temperatures of about 350° to 550° C., and is greatly accelerated by elevated pressures, such as pressures of from 5 to 100 or more atmospheres. I prefer to use high temperatures such as about 350° to 550° C. and moderately elevated pressures such as pressures up to about 20 atmospheres. At lower temperatures, e. g. about 150° to 350° C. it is especially useful to use high pressures, e. g. up to 100 or more atmospheres, the lower the temperature the higher being the pressure. It is to be understood, however, that the invention is in nowise limited as to the temperature and pressure employed.

Conveniently the olefine may be subjected to the reaction by passing it, preferably repeatedly and if desired in admixture with steam, with the vapor of an organic acid, e. g. a lower aliphatic or fatty acid through tubes or vessels at the desired temperature and pressure. Very satisfactory results may be obtained by the use of comparatively small amounts of the acid, especially when it is desired to avoid the formation of ester. Thus for example, in the production of ethanol and/or diethyl ether a mixture of ethylene, steam and an acid, such as formic, acetic, or trichloracetic acid, may be employed, the acid being present in amount between about 2 and 20% of the total volume, while if considerable quantities of ethyl acetate are desired a larger proportion of acid may conveniently be used. Advantageously, the reaction may be effected in the presence of catalysts capable of promoting hydration reactions, e. g. oxy-acids of phosphorus or salts thereof or zinc chloride, etc., and/or contact or filling materials such as pumice, kieselguhr, etc.

The olefine may be employed in conjunction with widely varying proportions of water vapor according to the nature of the products it is desired to obtain, although preferably large excess of steam should be avoided as it is liable to produce dilute alcohol or to render the recovery of concentrated products a matter of difficulty. If an alcohol is to be the main product, mixtures comprising less than two volumes of olefine for each volume of water vapor may with advantage be employed, while the use of mixtures containing considerable excess of olefine, for example from two to three volumes of olefine to each volume of water vapor, tends to promote the formation of ethers. Intermediate proportions may, of course, also be employed. If on the other hand the formation of an ester is desired, the olefine may be present in large excess, for example four or more times the amount of the water employed, or water may be entirely or substantially absent.

According to another form of the invention the olefine may be passed into contact with an organic acid in the liquid phase or with an aqueous solution of an organic acid, for instance as described in my co-pending U. S. application S. No. 640,001 filed October 28, 1932; thus for example ethylene may be led into liquid acetic acid or aqueous acetic acid, for example of concentration between about 10 and 50% or more maintained at the desired temperature and pressure. Alternatively mixtures of the olefine and steam may be similarly subjected to treatment with the organic acid or with an aqueous solution thereof. In any of such methods the gas or vapor to be treated with the organic acid or solution thereof may comprise organic acid vapor. Such processes are more especially useful at moderately high temperatures, e. g. about 150° C. to about 250° C., though they may be employed, if desired, at still higher temperatures.

While ethers produced according to the invention may be substantially completely separated from the reaction vapors in the free state, alcohols may, to a greater or less extent, combine with the organic acid employed as catalyst giving rise to esters. Thus when ethyl alcohol is produced from ethylene and water or water vapor in the presence of acetic acid, whether or not any ester is formed by direct reaction of the ethylene with the acid, at least part of the alcohol may be recovered as ethyl acetate, and the invention includes such ester formation, and if desired subsequent hydrolysis to obtain the free alcohol.

The products of reaction may be separated from water vapor, etc. and/or from one another in any convenient way, as for example by fractional condensation, with or without the use of an entraining liquid. If desired any ester formed may, either before or after condensation, be subjected to hydrolysis in any convenient way, to regenerate the alcohol, and the acid thus obtained may advantageously be returned to the reaction zone.

The invention is not limited to the formation of addition compounds from ethylene, but includes the production of alcohols or other addition products from olefines in general. For instance, the invention may be applied to the production of isopropyl alcohol from propylene and water. Moreover, mixtures of olefines, for instance mixtures of ethylene with propylene, butylene and/or other gaseous olefines, may be treated according to the invention.

The following example is given in order to illustrate the invention and is not to be regarded as in any way limiting it.

*Example*

A mixture comprising approximately 3 volumes of ethylene, 2 volumes of water vapor, and 1 volume of acetic acid vapor is repeatedly passed through a tube containing pumice and heated to a temperature of 450° C., under a pressure of 20 atmospheres. Finally the vapors leaving the reaction zone are cooled, and the alcohol and/or ethyl acetate formed are recovered for example by fractional condensation, or in any other convenient way.

It is to be understood that the term "water", unqualified, employed in the claims includes water both in the liquid and in the vapor phase.

What I claim and desire to secure by Letters Patent is:—

1. Process for the production of oxygen-containing addition products of ethylene, which comprises treating ethylene with lower aliphatic carboxylic acids at temperatures of at least 350° C. and under a pressure of at least 5 atmospheres in the absence of strong mineral acids.

2. Process for the manufacture of oxygen-containing addition products of ethylene which comprises treating ethylene with water in the presence of lower aliphatic carboxylic acids at a temperature of at least 350° C. and under a pressure of at least 5 atmospheres.

3. Process for the manufacture of ethanol which comprises heating a mixture comprising between 1 and 2 volumes of ethylene, 1 volume of water vapor and between 2 and 20% of the vapor of a lower aliphatic carboxylic acid to a temperature between 350° and 550° C. under a pressure up to 20 atmospheres.

4. Process for the manufacture of ethanol which comprises heating a mixture comprising between 1 and 2 volumes of ethylene, 1 volume of water vapor and between 2 and 20% of the vapor of a lower aliphatic carboxylic acid to a temperature between 350° and 550° C. under a pressure up to 20 atmospheres in the presence of a hydration catalyst.

5. Process for the manufacture of diethyl ether which comprises heating a mixture comprising between 2 and 3 volumes of ethylene, 1 volume of water vapor and 2 to 20% of the vapor of a lower aliphatic carboxylic acid to a temperature between 350° and 550° C. under a pressure up to 20 atmospheres in the presence of a hydration catalyst.

6. Process for the manufacture of ethyl acetate which comprises heating a mixture comprising at least 4 volumes of ethylene to each volume of water vapor with the vapor of acetic acid to a temperature between 350° and 550° C. under a pressure of 20 atmospheres in the presence of a hydration catalyst.

HENRY DREYFUS.